(12) United States Patent
Doyle et al.

(10) Patent No.: US 8,276,137 B2
(45) Date of Patent: Sep. 25, 2012

(54) CREATING A VIRTUAL MACHINE CONTAINING THIRD PARTY CODE

(75) Inventors: Ronald P. Doyle, Raleigh, NC (US);
Stephen J. Schmidt, Raleigh, NC (US);
Qingbo Wang, Beijing (CN); Ruth E. Willenborg, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 1379 days.

(21) Appl. No.: 11/872,793

(22) Filed: Oct. 16, 2007

(65) Prior Publication Data

US 2009/0100423 A1    Apr. 16, 2009

(51) Int. Cl.
*G06F 9/455* (2006.01)
*G06F 15/16* (2006.01)

(52) U.S. Cl. .............. 718/1; 709/230; 709/232

(58) Field of Classification Search .......... None
See application file for complete search history.

(56) References Cited

U.S. PATENT DOCUMENTS

| 6,195,650 B1* | 2/2001 | Gaither et al. .................... 1/1 |
| 7,886,291 B1* | 2/2011 | Jones et al. .................. 717/174 |
| 2005/0235123 A1 | 10/2005 | Zimmer et al. |
| 2005/0268336 A1* | 12/2005 | Finnegan ........................ 726/15 |
| 2007/0165937 A1* | 7/2007 | Markov et al. ................ 382/141 |

OTHER PUBLICATIONS

Pfaff, Ben et al. "Virtualization Aware File Systems: Getting Beyond the Limitations of Virtual Disks", 3rd Symposium on Networked Systems Design and Implementation Usenix Association, Berkeley, CA, XP002524394, ISBN: 1-931971-43-9, May 10, 2006.
Sugerman, Jeremy et al. "Virtualizing I/O Devices on VMware Workstation's Hosted Virtual Machine Monitor", Proceedings of the 2001 Usenix Annual Technical Conference, Usenix Association, ISBN: 1-880446-09-X, 2001.

* cited by examiner

*Primary Examiner* — Emerson Puente
*Assistant Examiner* — Jonathan R Labud
(74) *Attorney, Agent, or Firm* — Cuenot, Forsythe & Kim, LLC

(57) ABSTRACT

A Virtual Machine (VM) is created utilizing a virtual Operating System (OS) disk and virtual application disks, each of which may be from disparate third party suppliers. One or more files in the virtual application disk are then linked to a specific file system location (node) in the virtual OS disk.

20 Claims, 4 Drawing Sheets

CREATING A VIRTUAL MACHINE CONTAINING THIRD PARTY CODE

BACKGROUND OF THE INVENTION

The present disclosure relates to the field of computers, and specifically to software. Still more specifically, the present disclosure relates to Virtual Machines (VMs).

Virtual Machines (VMs), of which specific instances are referred to as Virtual Appliances that use Virtual Images, have emerged as a new distribution vehicle for software. Each VM is typically made up of a fixed Operating System (OS), such as the open-source Linux® OS, which then runs one or more applications in a virtual container (purely software based). Linux® is the registered trademark of Linus Torvalds in the U.S., other countries, or both.

BRIEF SUMMARY OF THE INVENTION

A Virtual Machine (VM) is created utilizing a virtual Operating System (OS) disk and virtual application disks, each of which may be from disparate third party suppliers. The virtual application disks, which are interchangeable in the VM and may be selected from a plurality of applications, are utilized in the VM in accordance with the VM profile. One or more files in the virtual application disk are then linked to a specific file system location (node) in the virtual OS disk.

DETAILED DESCRIPTION OF THE INVENTION

Figure 1:
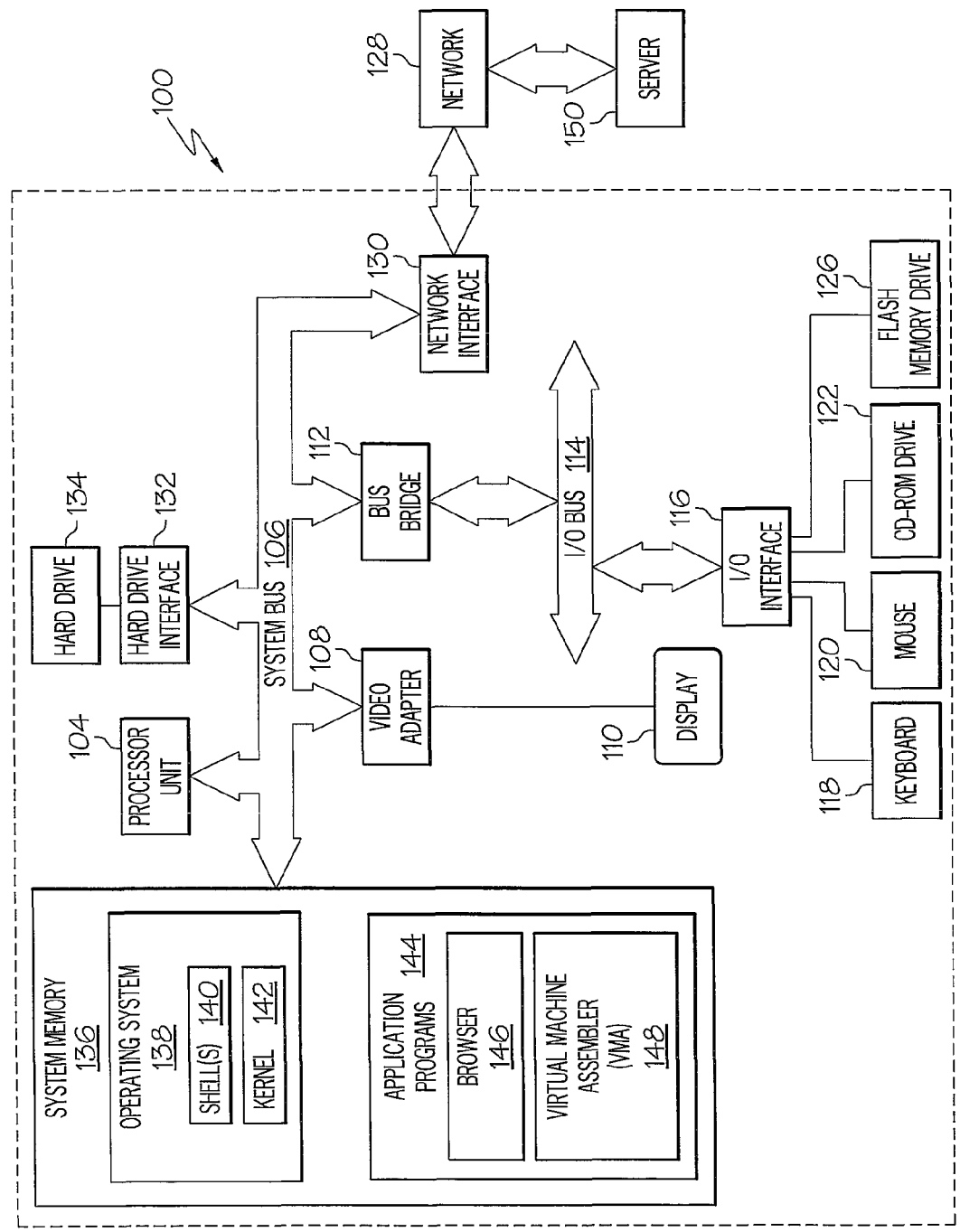
FIG. 1 depicts an exemplary physical computer in which the present invention may be implemented.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java® (Java is a trademark or registered trademark of Sun Microsystems, Inc. in the United States and other countries), Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

With reference now to FIG. 1, there is depicted a block diagram of an exemplary computer 100, with which the present invention may be utilized. Computer 100 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk-Read Only Memory (CD-ROM) drive 122, and a flash memory drive 126. The format of the ports connected to I/O interface 116 may be any known to those skilled in the art of computer architecture, including but not limited to Universal Serial Bus (USB) ports.

Computer 100 is able to communicate with a server 150 via a network 128 using a network interface 130, which is coupled to system bus 106. Network 128 may be an external network such as the Internet, or an internal network such as an Ethernet or a Virtual Private Network (VPN). Server 150 may be architecturally configured in the manner depicted for computer 100.

A hard drive interface 132 is also coupled to system bus 106. Hard drive interface 132 interfaces with a hard drive 134. In one embodiment, hard drive 134 populates a system memory 136, which is also coupled to system bus 106. System memory 136 is defined as a lowest level of volatile memory in computer 100. This volatile memory may include additional higher levels of volatile memory (not shown), including, but not limited to, cache memory, registers, and buffers. Code that populates system memory 136 includes an operating system (OS) 138 and application programs 144.

OS 138 includes a shell 140, for providing transparent user access to resources such as application programs 144. Generally, shell 140 (as it is called in UNIX®—UNIX is a registered trademark of The Open Group in the Unites States and other countries) is a program that provides an interpreter and an interface between the user and the operating system. Shell 140 provides a system prompt, interprets commands entered by keyboard 118, mouse 120, or other user input media, and sends the interpreted command(s) to the appropriate lower levels of the operating system (e.g., kernel 142) for processing. As depicted, OS 138 also includes kernel 142, which includes lower levels of functionality for OS 138. Kernel 142 provides essential services required by other parts of OS 138 and application programs 144. The services provided by kernel 142 include memory management, process and task management, disk management, and I/O device management.

Application programs 144 include a browser 146. Browser 146 includes program modules and instructions enabling a World Wide Web (WWW) client (i.e., computer 100) to send and receive network messages to the Internet. Computer 100 may utilize HyperText Transfer Protocol (HTTP) messaging to enable communication with server 150. Application programs 144 in system memory 136 also include a Virtual Machine Assembler (VMA) 148, which executes the Virtual Machine (VM) created in the steps described below in FIGS. 2-4. Note that while VMA 148 may include the functionality of a hypervisor (also known as a Virtual Machine Manager—VMM), which manages and supervises multiple operating systems, the user of such a hypervisor is not essential to the present invention. That is, it is irrelevant to the present invention whether a hypervisor is involved in the operations of the VM described herein. Furthermore, use of the present invention is not limited to any particular virtual machine implementation, as long as the VM utilizes the features described herein for linking an application to a specific node in a virtual OS disk.

In one embodiment, computer 100 is able to download VMA 148 from service provider server 150, preferably in an "on demand" basis.

The hardware elements depicted in computer 100 are not intended to be exhaustive, but rather are representative to highlight essential components required by the present invention. For instance, computer 100 may include alternate memory storage devices such as magnetic cassettes, Digital Versatile Disks (DVDs), Bernoulli cartridges, and the like. These and other variations are intended to be within the spirit and scope of the present invention. Note that the hardware architecture for service provider server 150 may be substantially similar to that shown for computer 100.

Figure 2:
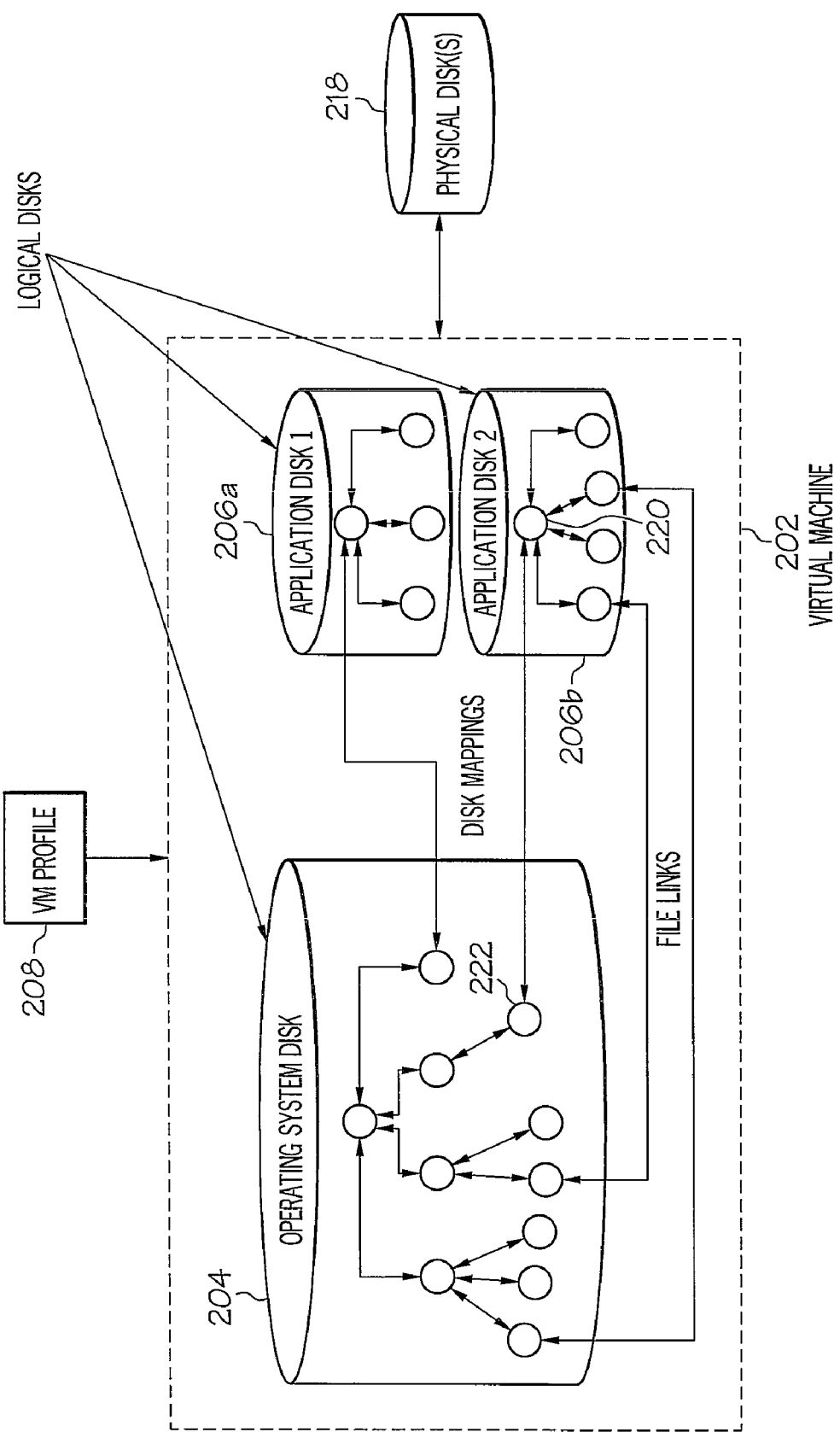
FIG. 2 illustrates an exemplary Virtual Machine (VM) created by the present invention.

Referring now to FIG. 2, an overview of a Virtual Machine (VM) 202, which is created by assembling code and files from different suppliers in a manner described below, is presented. VM 202, which is created by and becomes part of the VMA 148 shown in FIG. 1, is a software-created virtualized environment for executing software in a hardware-agnostic manner, and includes a virtual Operating System (OS) disk 204 and one or more virtual application disks 206a-b. Note that OS disk 204 and application disks 206a-b are all logical disks, which are defined as logical groupings of data that are stored on one or more physical disks 218. A VM profile 208 has reference instances of the virtual application disks 206a-b from multiple available application systems located on the physical disks 218. In one embodiment, virtual application disk 206a is a different software application than the application found in virtual application disk 206b, and thus may be from different vendors/suppliers/sources. Thus, each virtual application disk 206a-b is made up of partitions, which may be on one or more physical disks 218.

Note that the OS and applications running from the respective virtual OS disk 204 and virtual application disk 206 are organized from a file system perspective as a tree having nodes. In order for the applications to execute properly, one or more directory nodes in each virtual application disk 206 is mapped to (file linked) to a directory node in the OS in the virtual OS disk 204. For example, assume that virtual application disk 206b is from an application service, and that a file directory (e.g., /filedirectory) at node 220 must reside under the Linux OS directory found at node 222 (e.g., /opt/company/filedirectory). Node 220 is thus mapped to node 222. This mapping is performed with system symbolic links to the virtual application disk. At this point, programs that appear to the OS residing under /opt/company/filedirectory actually reside on the application logical disk 206b.

Figure 3:
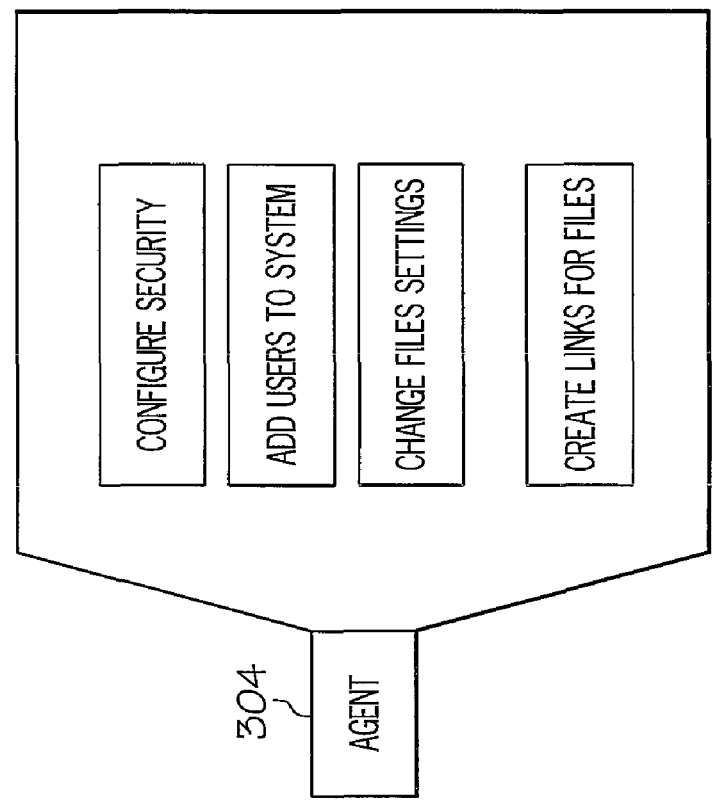
FIG. 3 depicts additional detail or a virtual application disk used by the VM shown in FIG. 2.
Figure 3:
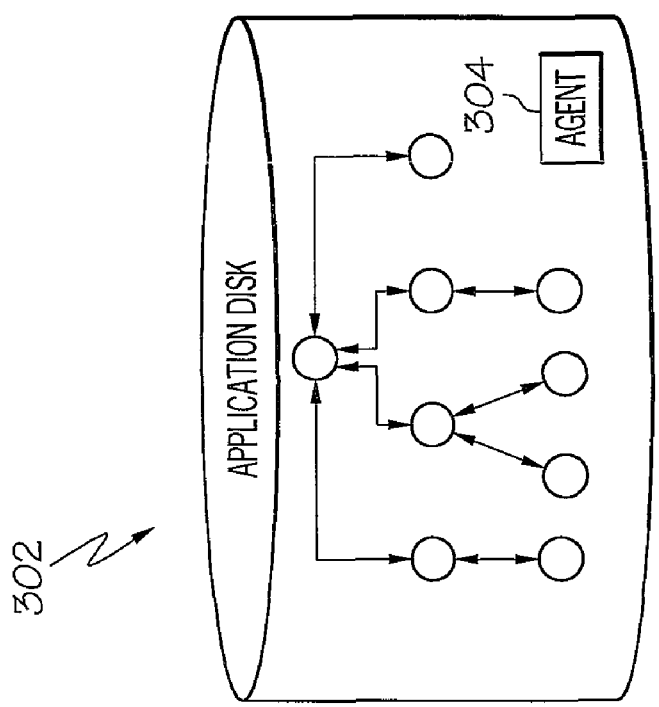

With reference now to FIG. 3, additional detail for a virtual application disk 302 (equivalent to virtual application disks 206a or b shown in FIG. 2) is presented. Within virtual application disk 302 is an agent 304. Agent 304 is a smart agent that can configure security (consisting of creating new users relevant to the application disk being linked into the system, or modifying file level security settings relevant to new or existing system users), and create links for files residing in the virtual application disk 302 to other virtual disks (both other virtual application disks, and the virtual OS disk). The agent 304 has the flexibility to link the files in the virtual application disk 302 to specific paths or directories of the OS virtual disk 204 shown above in FIG. 2.

Figure 4:
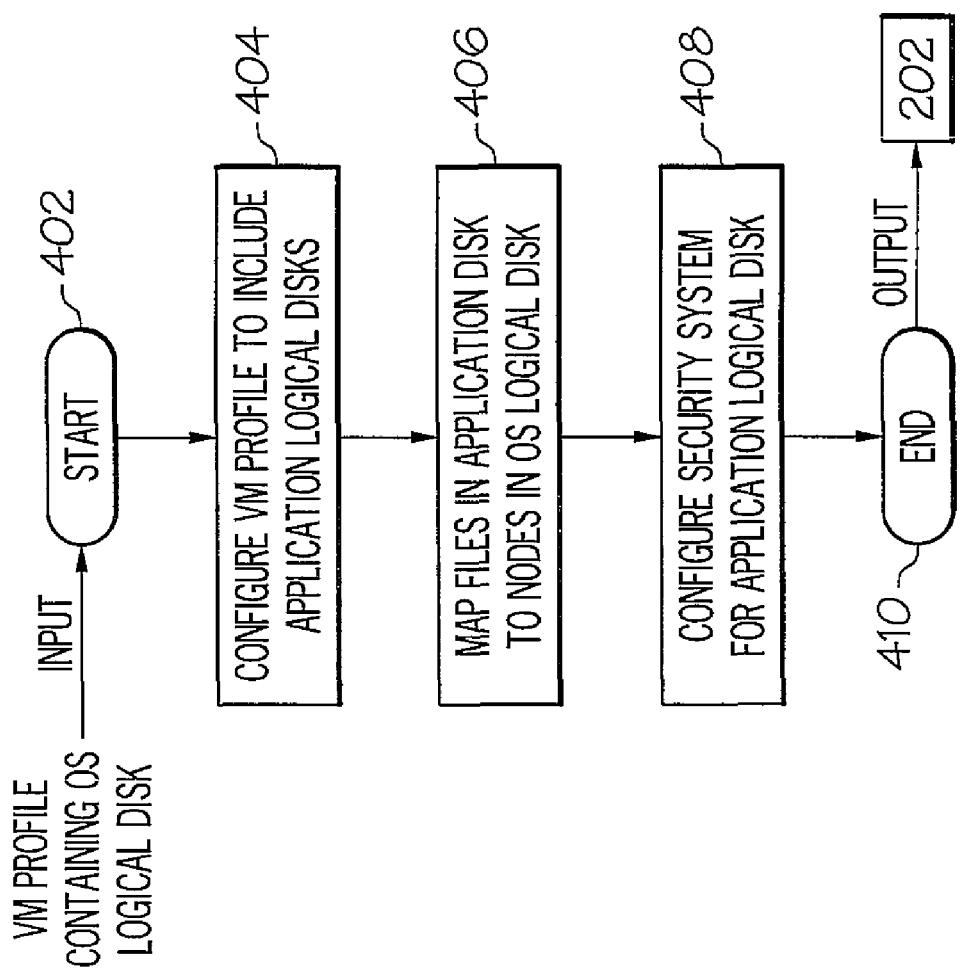
FIG. 4 is a high-level flow-chart of exemplary steps taken by the present invention to create a VM using code from third-party vendors.

With reference now to FIG. 4, a flow-chart of exemplary steps taken to create a Virtual Machine (VM) is presented. Initiator block 402 represents the input state of a virtual, machine, which includes a VM profile that contains an OS logical disk. As described above, the VM is a software-created virtualized environment for executing software in a hardware-agnostic manner. The VM profile defines the OS logical disk that is to be started within the VM. The new application logical disks are then configured into the VM profile (block 404), making them visible to the VM. One or more files and/or directories in the virtual application disk are then linked (mapped) to a specific file system location (e.g., node) in the virtual OS disk in the VM (block 406). Thus, the VM includes the virtual OS disk and at least one virtual application disk, making the application(s) contained within the application virtual application disk(s) available to the VM. Appropriate security is then configured (as indicated by block 408 and described above in FIG. 3), and the process ends at terminator block 410, when the output of the virtual OS disk and the linked virtual application disk(s) are delivered as VM 202.

As described herein, the present invention provides the capability to assemble a single virtual image containing logical virtual application disks coming from different organizations. For example, a Linux OS distribution can be aggregated with a second logical virtual disk. The installation of each logical application disk is only performed once, and may then be assembled together using Linux® file links. Thus, each application can be separately chosen, distributed, and maintained for a particular OS in the VM.

Note that the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method for creating a Virtual Machine containing third party code, the method comprising:

configuring a Virtual Machine (VM) profile and VM file system for a Virtual Machine (VM), wherein the Virtual Machine (VM) is a software-created virtualized environment for executing software in a hardware-agnostic manner, and wherein the VM profile defines which Operating System (OS) is to be used by the VM, and wherein the VM file system defines a mapped relationship between virtual files in at least one virtual application disk and physical files in at least one physical disk; and linking a file in said at least one virtual application disk to a specific file system location in a virtual OS disk in the VM, wherein the VM comprises the virtual OS disk and said at least one virtual application disk, and wherein instructions in the file from said at least one virtual application disk are linked to and executed in conjunction with OS instructions located at the specific file system location in the virtual OS disk.

2. The method of claim 1, further comprising:
configuring security for said at least one virtual application disk.

3. The method of claim 2, wherein configured security determines and controls which users are authorized to utilize newly linked applications between said at least one virtual application disk and said virtual OS disk within the VM.

4. The method of claim 3, wherein the configured security determines and controls which users are authorized to change file settings for files in said at least one virtual application disk.

5. The method of claim 4, wherein the configured security and file linking of the file in said at least one virtual application disk to the specific file system location in a virtual Operating System (OS) disk are performed by an agent in said at least one virtual application disk.

6. The method of claim 5, wherein the agent is automatically run as a system service in response to the VM being activated.

7. The method of claim 6, wherein the VM is activated by a hypervisor, wherein the hypervisor is a virtualization platform that allows multiple operating systems to run on a same host computer.

8. The method of claim 5, wherein the agent is manually invoked by a user of the VM.

9. The method of claim 1, wherein the VM comprises multiple virtual application disks, wherein each of the multiple virtual applications disks is from a different vendor.

10. A system comprising:
a processor;
a data bus coupled to the processor;
a memory coupled to the data bus; and
a computer-usable medium embodying computer program code, the computer program code comprising instructions executable by the processor and configured for creating a Virtual Machine (VM) by performing the steps of:

configuring a Virtual Machine (VM) profile and VM file system for a Virtual Machine (VM), wherein the Virtual Machine (VM) is a software-created virtualized environment for executing software in a hardware-agnostic manner, and wherein the VM profile defines which Operating System (OS) is to be used by the VM, and wherein the VM file system defines a mapped relationship between virtual files in at least one virtual application disk and physical files in at least one physical disk; and linking a file in said at least one virtual application disk to a specific file system location in a virtual OS disk in the VM, wherein the VM comprises the virtual OS disk and said at least one virtual application disk, and wherein instructions in the file from said at least one virtual application disk are linked to and executed in conjunction with OS instructions located at the specific file system location in the virtual OS disk.

11. The system of claim 10, wherein the instructions are further configured for:

configuring security for said at least one virtual application disk.

12. The system of claim 11, wherein configured security determines and controls which users are authorized to utilize the VM.

13. The system of claim 12, wherein the configured security determines and controls which users are authorized to change file settings for files in said at least one virtual application disk.

14. The system of claim 10, wherein the VM comprises multiple virtual application disks, wherein each of the multiple virtual applications disks is from a different vendor.

15. A computer program product comprising a computer usable storage medium, not including a propagating signal, having stored therein computer usable program code for creating a Virtual Machine (VM), the computer usable program code, which when executed by a computer hardware system, causes the computer hardware system to perform:

configuring a Virtual Machine (VM) profile and VM file system for a Virtual Machine (VM), wherein the Virtual Machine (VM) is a software-created virtualized environment for executing software in a hardware-agnostic manner, and wherein the VM profile defines which Operating System (OS) is to be used by the VM, and wherein the VM file system defines a mapped relationship between virtual files in at least one virtual application disk and physical files in at least one physical disk; and linking a file in said at least one virtual application disk to a specific file system location in a virtual OS disk in the VM, wherein the VM comprises the virtual OS disk and said at least one virtual application disk, and wherein instructions in the file from said at least one virtual application disk are linked to and executed in conjunction with OS instructions located at the specific file system location in the virtual OS disk.

16. The computer program product of claim 15, wherein the computer usable program code further causes the computer hardware system to perform configuring security for said at least one virtual application disk.

17. The computer program product of claim 16, wherein configured security determines and controls which users are authorized to utilize the VM.

18. The computer program product of claim 17, wherein the configured security determines and controls which users are authorized to change file settings for files in said at least one virtual application disk.

19. The computer program product of claim 15, wherein the computer hardware system is a remote server, and wherein the computer usable program code is deployable to a local computer from the remote server.

20. The computer program product of claim 15, wherein the computer usable program code is provided by a service provider to a customer on an on-demand basis.

* * * * *